United States Patent [19]
Pröschel et al.

[11] Patent Number: 6,102,574
[45] Date of Patent: Aug. 15, 2000

[54] ROLLING MOUNTING FOR RAIL VEHICLES WITH CURRENT PASSAGE

[75] Inventors: Edgar Pröschel, Schwebheim; Anton Schmidt, Hassfurt; Richard Karbacher, Donnersdorf, all of Germany

[73] Assignee: FAG OEM und Handel AG, Germany

[21] Appl. No.: 09/248,634

[22] Filed: Feb. 11, 1999

[30] Foreign Application Priority Data

Feb. 12, 1998 [DE] Germany ............................ 198 05 566

[51] Int. Cl.$^7$ .................................................... F16C 32/04
[52] U.S. Cl. ......................................... 384/476; 105/218.1
[58] Field of Search ................................. 295/1, 36.1, 37, 295/38, 43, 44, 42.1; 105/34.1, 49, 218.1; 384/476

[56] References Cited

U.S. PATENT DOCUMENTS 3,523,709  8/1970  Heggy et al. ................... 105/218.1 X
5,468,072  11/1995  Ekdahl et al. ....................... 384/476 X

*Primary Examiner*—Russell D. Stormer
*Attorney, Agent, or Firm*—Ostrolenk, Faber, Gerb & Soffen, LLP

[57] ABSTRACT

In order to allow current to pass a shaft bearing of a rail vehicle an additional rolling bearing is provided on the shaft and is electrically insulated relative to the shaft bearing. The inner ring of the additional rolling bearing is seated firmly on the shaft. A gap between the exterior of the outer ring of the additional bearing and the housing of the rolling mounting is provided with an insulating bush. The gap on insulating bush is bridged by an electrically insulated connector extending from outside the bearing housing and extending between the bearing housing and the outer ring of the additional rolling bearing.

15 Claims, 1 Drawing Sheet

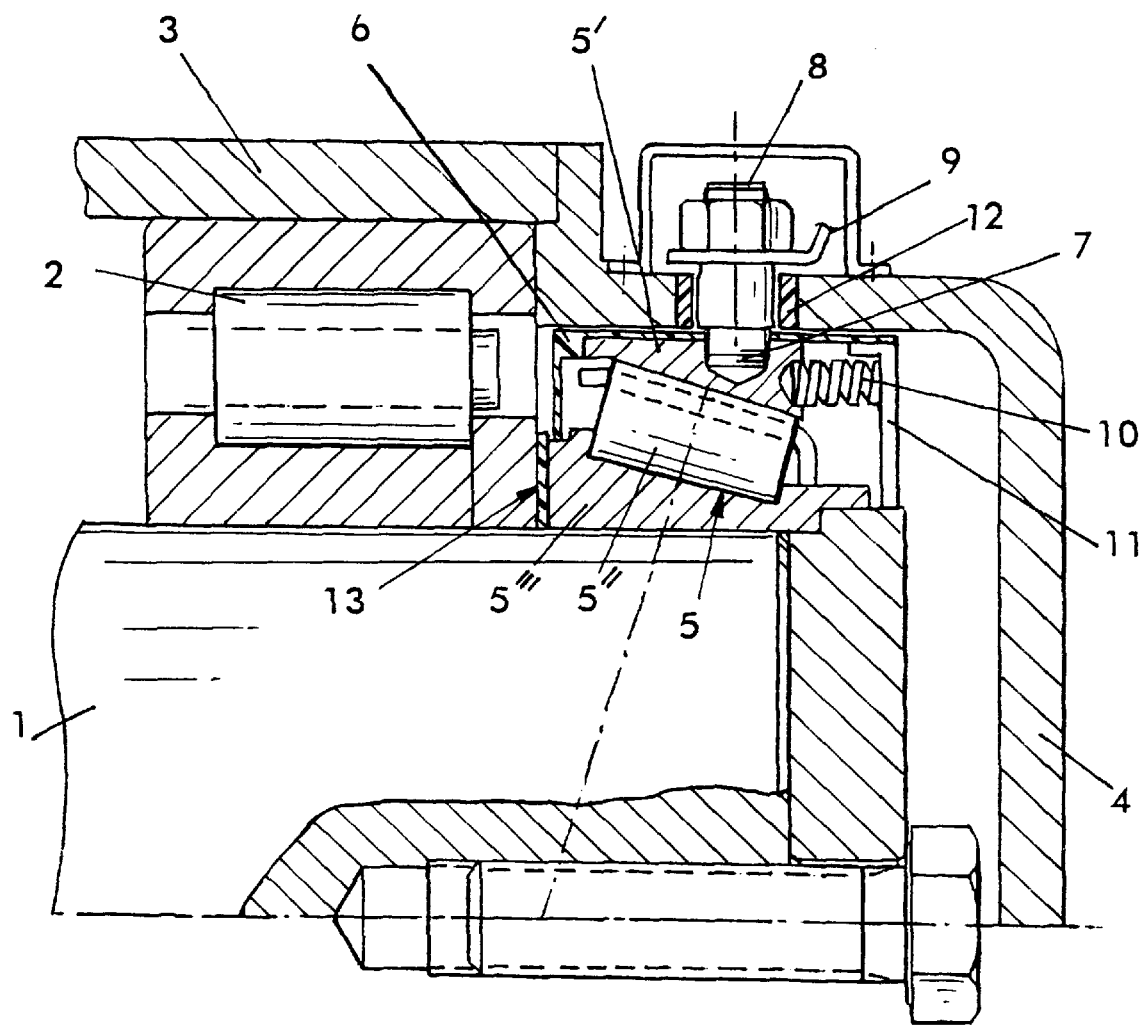

ROLLING MOUNTING FOR RAIL VEHICLES WITH CURRENT PASSAGE

BACKGROUND OF THE INVENTION

The present invention relates to a rolling mounting and particularly to an additional bearing on the mounting shaft which enables electrical current transmission past the rolling mounting.

Electrically driven rail vehicles have always had a problem with transmitting electric current. Because serious damage may occur when current passes through rolling bearings, many measures are known for keeping current away from the bearings. For example, DE-C-41 00 587 discloses an insulating layer having high resistance. There are also many proposals which make it possible for the required current to be carried in a different way. Thus, for example, German Utility Model 92 09 504 proposes complicated grounding contacts around the bearing, which require a large space. European Patent Specification 475,841 suggests passing current in the region of the seal of the bearing. Although this saves space, it is not operationally reliable, since, for example, the bearing grease may cause a break in electrical contact.

SUMMARY OF THE INVENTION AND DESCRIPTION OF THE DRAWING

The object of the invention is, therefore, to provide a current passage device for a rolling mounting which does not have the above described disadvantages, and, particularly, a device of small design, which ensures that current is reliably transmitted.

To achieve this object, an additional inclined rolling bearing is provided on the same mounting shaft as the main load bearing of the rail vehicle. The additional bearing is electrically insulated from the main bearing. The inner ring of the additional bearing is on the shaft. A gap is defined or insulating bush is disposed between the exterior of the outer ring and the housing of the rolling mounting. That gap is bridged by an electric connector, like a screw, which is also insulated relative to the housing. The connector connects from outside the housing to the outer ring of the additional bearing.

The additional bearing is an inclined rolling bearing which is arranged on the shaft axially next to the main rolling bearing which transmits the load. Since the inclined rolling bearing has, relative to the housing of the rolling mounting, an insulating bush or a gap on the cylindrical surface of the outer ring of that bearing, a screw with current contact is provided. The screw bridges over the bush or gap. Current therefore flows through the screw, the outer ring of the bearing, the tapered rollers of the additional bearing, which afford optimum contact with the raceway rings, the inner ring of the additional bearing, to the shaft, and from there current is transmitted further in the usual way. The above mentioned insulating bush is intended to allow axial displacement of the outer ring of the additional bearing, so that, with the aid of the current transmitting additional bearing, axial prestressing of the entire mounting can also be provided, specifically by an additional compression spring which acts axially on the outer ring of the additional bearing and is supported in the housing. The axial displaceability of the outer ring is achieved in that the screw connected to it is arranged in an electrically insulated long hole bore of the housing.

The transmission of current in the additional inclined rolling bearing may be further improved by providing that bearing with an electrically conductive lubricant particularly at the ring raceways. Coating the bearing surfaces with a conductive metal, for example nickel, is also highly beneficial for this purpose.

Other features and advantages of the present invention will become apparent from the following description of the invention which refers to the accompanying drawings which shows a part longitudinal section through a shaft mounting having the device according to the invention for the transmission of current.

DETAILED DESCRIPTION OF THE INVENTION

A shaft mounting of the invention comprises a cylindrical main rolling bearing 2, which is arranged on a shaft 1 and which transmits the radial and axial loads of the rail vehicle to a housing 3 of the mounting at the outer ring of the main bearing. A potlike cover 4 extends past the axial end of the shaft 1.

An additional bearing is seated on the shaft 1. The cover 4 extends axially over the bearing 5. The additional bearing comprises a tapered roller bearing 5. It has an outer ring 5' that is seated in an insulating bush 6, with only slight play relative to the cover 4, so that this bearing can scarcely transmit any radial loads. Furthermore, the outer ring 5' has at least one radially extending threaded bore 7, in which a respective connector 8, in the form of a screw, is fastened. The screw is connected to an electric cable 9 bringing current to the outside of the housing 3. Current passes via the tapered roller bearing 5. Current is carried from the bogie, not shown, by the cable 9 to the screw 8. The current passes from the screw to the outer ring 5', in which the tapered bearing rollers 5" are arranged. When the shaft 1 is stationary, the current can pass to the shaft 1 as a result of the direct contact of the tapered rollers 5" on the outer ring 5' and inner ring 5'". Hydrodynamic lubricating films often build up during operation. It is then beneficial if an electrically conductive lubricant is used. In both operating states, current passage may be further assisted if the bearing parts 5', 5" and 5'", and particularly the raceways, located opposite one another are coated with an electrically conductive metal, such as nickel, having a layer thickness of approximately 10 $\mu$m.

To improve the current passage of the tapered roller bearing 5, the outer ring 5' is located opposite an annular array of a plurality of compression springs 10 supported via a disk 11 and also arranged in the cover 4. The springs urge the rollers 5" to remain in metallic contact with the raceway rings 5' and 5" for as long as possible, thus further assisting the passage of current.

To cause current to always follow the correct path, insulating means, such as the ring 12 and the disk 13, are also provided, with their positions and what they insulate shown in the FIGURE.

Moreover, the screw 8 also prevents the outer bearing ring 5' from rotating in the cover 4, as this always is highly desirable in rolling bearings.

Although the present invention has been described in relation to a particular embodiment thereof, many other variations and modifications and other uses will become apparent to those skilled in the art. It is preferred, therefore, that the present invention be limited not by the specific disclosure herein, but only by the appended claims.

What is claimed is:

1. A rolling mounting for a shaft for a rail vehicle wherein the mounting is adapted for transmitting electric current, the mounting comprising:

a main rolling bearing on the shaft for transmitting vehicle load to the shaft;

a device axially next to the rolling bearing at the shaft for transmitting electric current from a housing around the rolling mounting to the shaft, the device comprising:

an additional rolling bearing also around the shaft, the additional rolling bearing being electrically insulated from the main rolling bearing axially next to it, the additional rolling bearing having an inner ring rotatable with the shaft, an outer ring outward of the inner ring and rolling elements at and between the races at the inner and outer rings; the outer ring having an exterior;

a housing around the mounting, the exterior of the outer ring, the outer ring is spaced from the housing around the rolling mounting;

at least one electric connector extending from an electrical connection outside the housing around the rolling mounting through the outer housing and being insulated from the housing and extending to the outer ring, whereby the electrical connector bridges the gap between the outer ring and the housing.

2. The rolling mounting of claim 1, wherein the additional rolling bearing is an inclined rolling bearing, the additional bearing having inclined races on the inner and the outer ring.

3. The rolling mounting of claim 2, further comprising an insulating bush in the gap between the exterior of the outer ring and the housing, and the electric connector extending through the insulating bush and bridging the bush.

4. The rolling mounting of claim 3, wherein the housing includes a cover at the side of the rolling mounting at the additional inclined rolling bearing, extending radially inward past the inclined rolling bearing.

5. The rolling mounting of claim 4, wherein the cover extends axially past the electrical connector and the electrical connector passes through the cover when passing through the housing.

6. The rolling mounting of claim 2, wherein the housing includes a cover at the side of the rolling mounting at the additional inclined rolling bearing, extending radially inward past the inclined rolling bearing; and wherein the cover extends axially past the electrical connector and the electrical connector passes through the cover when passing through the housing.

7. The rolling mounting of claim 2, wherein the main rolling bearing also includes an inner ring on the shaft, and outer ring attached to the housing and rolling elements between the inner and outer rings.

8. The rolling mounting of claim 2, wherein the additional inclined rolling bearing comprises a single row tapered roller bearing, the rolling element being a tapered roller.

9. The rolling mounting of claim 2, further comprising bearing lubricant in the region of the inclined rolling bearing, and the lubricant being electrically conductive.

10. The rolling mounting of claim 9, wherein the lubricant is at the races of the inclined rolling bearing and at the rolling elements thereof.

11. The rolling mounting of claim 10, wherein at least the races of the inclined rolling bearing comprise raceway surfaces that are coated with an electrically conductive metal.

12. The rolling mounting of claim 2, wherein at least the races of the inclined rolling bearing comprise raceway surfaces that are coated with an electrically conductive metal.

13. The rolling mounting of claim 12, wherein the conductive metal comprises nickel.

14. The rolling mounting of claim 13, wherein the conductive metal has a layer thickness on the raceways of approximately 10 $\mu$m.

15. The rolling mounting of claim 2, further comprising a spring axially loading the additional inclined roller bearing in the direction toward the main roller bearing.

* * * * *